United States Patent [19]

Weatherhogg

[11] E Re. 28,501

[45] Reissued Aug. 5, 1975

[54] SERVO BOOSTERS

[75] Inventor: Charles Brian Weatherhogg, Harborne, England

[73] Assignee: Girling Limited, Birmingham, England

[22] Filed: Sept. 30, 1974

[21] Appl. No.: 510,705

Related U.S. Patent Documents

Reissue of:

[64] Patent No.: 3,805,680
Issued: Apr. 23, 1974
Appl. No.: 263,131
Filed: June 15, 1972

[30] Foreign Application Priority Data

June 17, 1971 United Kingdom ..... 28365/71
Oct. 21, 1971 United Kingdom ..... 48882/71

[52] U.S. Cl. ..... 92/48; 92/94; 92/97
[51] Int. Cl. ..... F01b 19/00
[58] Field of Search ..... 92/48, 49, 63, 64, 94, 92/97

[56] References Cited

UNITED STATES PATENTS 3,289,547 12/1966 Kytta ..... 92/48 X

*Primary Examiner*—Martin P. Schwadron
*Assistant Examiner*—Abraham Hershkovitz
*Attorney, Agent, or Firm*—Scrivener Parker Scrivener and Clarke

[57] ABSTRACT

The present invention relates to a tandem fluid-pressure servo booster comprising a housing, a rigid internal wall within the housing, and a movable wall on each side of the rigid wall, defining four chambers axially spaced within the housing, there being a plurality of fluid passageways between an internal surface of the housing and the periphery of the rigid wall connect a first pair of said chambers, and a plurality of tubular ducts within the housing connect a second pair of said chambers, said tubular ducts each having one end located in the rigid internal wall and passing through the peripheral regions of one of the movable walls.

23 Claims, 9 Drawing Figures

6 Sheets-Sheet 1
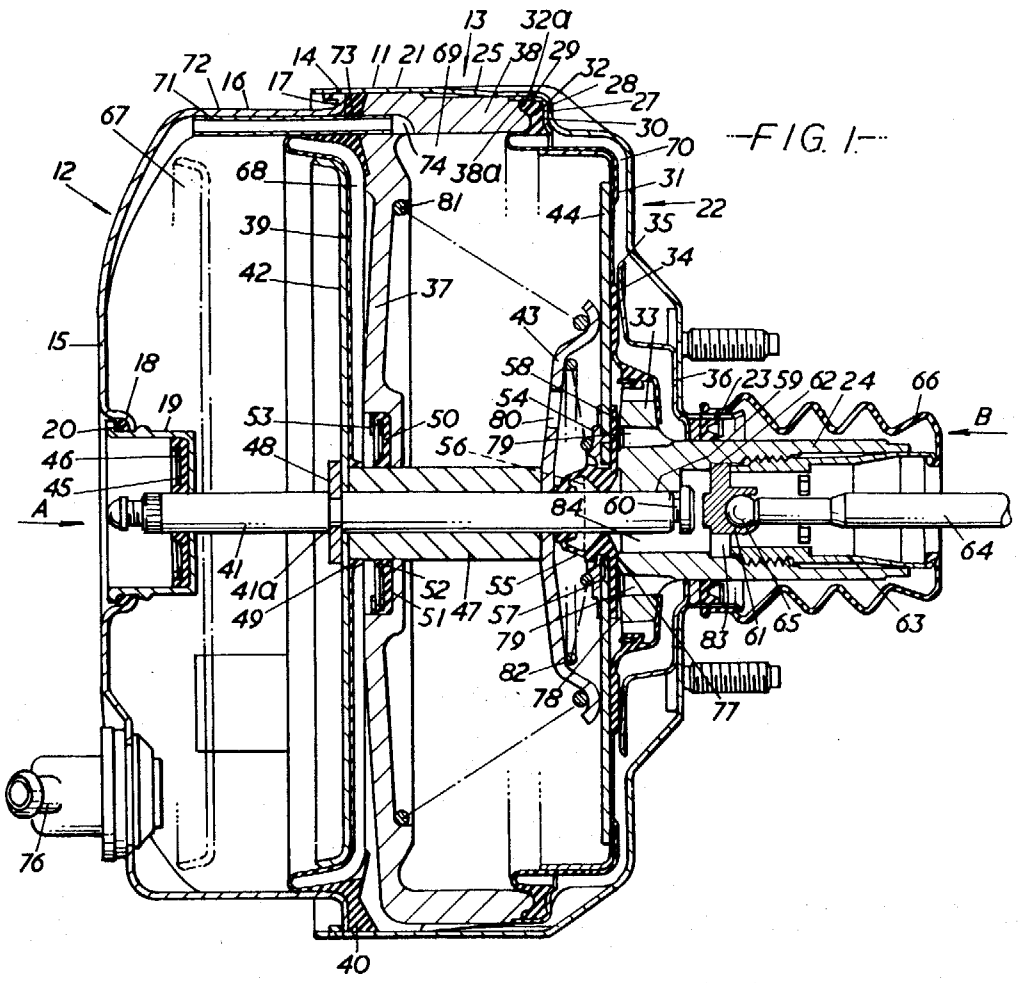

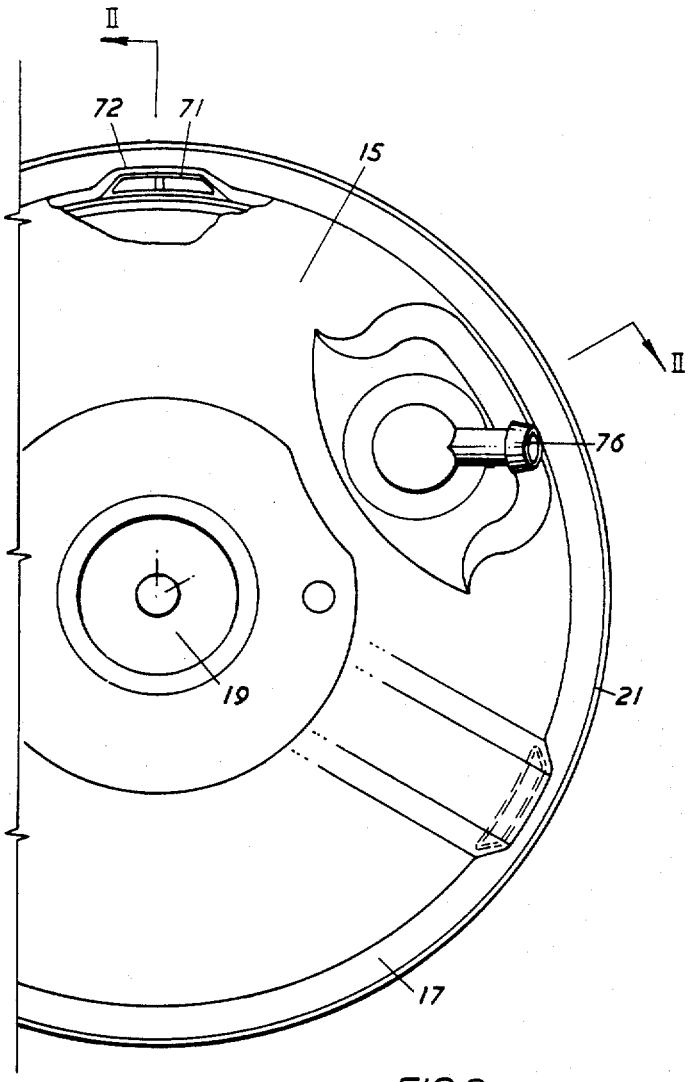
—FIG. 2.—

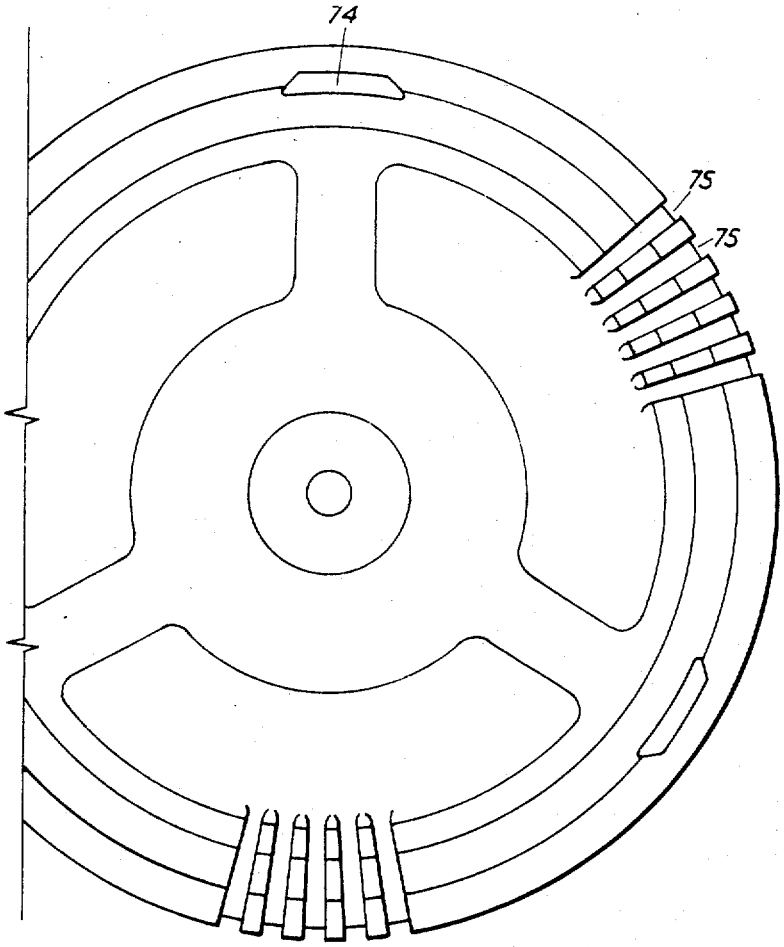
— FIG.5.—

SERVO BOOSTERS

Matter enclosed in heavy brackets [ ] appears in the original patent but forms no part of this reissue specification; matter printed in italics indicates the additions made by reissue.

---

The present invention relates to tandem fluid-pressure servo boosters and has particular application to a tandem fluid-pressure servo booster for use with a vehicle braking system.

Tandem fluid-pressure servo boosters are known and generally comprise a hollow casing having a rigid internal wall with a movable wall on each side thereof, said rigid and movable walls defining four separate chambers axially spaced within the casing. The first and third chambers, along the axis of the housing, are connected for common pressure conditions, the second and fourth chambers are connected for common pressure conditions, and both movable walls are connected to a common output member.

In tandem fluid pressure boosters of the type described above all four chambers are maintained at substantially uniform pressure when the booster is inoperative and the second and fourth chambers are charged with pressure fluid, e.g., air, to cause mutual displacement of the two movable walls when the device is operated.

According to the present invention a tandem fluid-pressure servo booster comprises a housing, a rigid internal wall within the housing, a movable wall on each side of the rigid wall, said walls defining four chambers axially spaced within the housing, a plurality of fluid passageways between an internal surface of the housing and the periphery of the rigid wall connecting a first pair of said chambers, and a plurality of tubular ducts, within the casing, connecting a second pair of said chambers, said tubular ducts each having one end located in the rigid internal wall and passing through the peripheral regions of one of the movable walls.

Preferably each movable wall comprises a flexible diaphragm and according to this aspect of the present invention, the tubular ducts pass through an enlarged peripheral region of a flexible diaphragm. Preferably the enlarged peripheral region of the diaphragm through which the tubular ducts pass includes an inwardly directed lip in sealing engagement with the internal rigid wall.

According to a further aspect of the present invention a tandem fluid-pressure booster comprises a housing having a rigid internal wall separating two movable walls to define four chambers axially spaced within the housing, said rigid wall having a radial flange at its peripheral region which flange engages and seals a peripheral region of one of the movable walls against an annular ring seated within the housing.

Preferably fluid pressure passages connecting two of the chambers for common pressure conditions are defined between the annular ring and internal surfaces of the housing.

According to another aspect of the invention, said first pair of chambers are interconnected by way of one or more passageways extending axially of the booster housing between an internal surface of the housing and the periphery of said rigid wall, and one or more radially extending holes located in said rigid wall and communicating with said passageways.

Preferably, the periphery of at least one of the flexible diaphragms is held against a shoulder on the rigid wall by means of an annular band.

Preferably, the annular band embraces an axially extending portion of said diaphragm periphery from which extend a plurality of tongues which engage in respective recesses in the rigid wall.

Advantageously, the peripheral portion of the diaphragm has an outer surface which is provided with one or more teeth, or tooth-like projections, which are adapted to engage the inner surface of said annular band to inhibit removal of the band therefrom.

In a preferred embodiment, the rearward flexible diaphragm is located by the annular band, said shoulder being formed on an axially extending, peripheral flange portion of said rigid wall.

The two movable walls are conveniently connected to a common output rod and according to this aspect of the present invention a tandem fluid-pressure servo booster comprises a housing having an internal rigid wall and two movable walls separated by the rigid wall to define four chambers axially spaced within the housing, pressure fluid passageways connecting a first pair of said chambers and pressure fluid ducts connecting a second pair of said chambers, an axially extending rod connecting both movable walls and constituting a common output rod, a first one of said movable walls being axially located on the common output rod by a sleeve member and said movable wall presenting an axially extending resilient lip sealingly engaged with the sleeve.

Preferably the sleeve passes through the rigid internal wall and a flexible seal is provided between the internal wall and the sleeve. Conveniently the seal between the rigid internal wall and the sleeve comprises an annular sealing member, restrained in a recess in the rigid wall by spring means, and an axially extending lip engaged with the external diameter of the sleeve.

According to a further aspect of the present invention a tandem fluid-pressure servo booster comprises a housing having an internal rigid wall separating two movable walls to define four chambers axially spaced within the housing, one of the said flexible walls being in sealing engagement with an axially extending output shaft by means of a twin-lipped seal, the outer diameter of the seal engaged with the internal diameter of the movable wall being greater than the greatest internal diameter of the seal between the two seal faces engaging the rod.

The present invention also envisages a method for assembling a tandem fluid-pressure servo booster comprising a housing having a rigid internal wall and a movable wall on either side thereof, said walls defining four chambers axially spaced within the housing, and according to this aspect of the present invention a method of assembling the booster comprises the steps of assembling the three walls on an axial assembly with a return spring for the movable walls positioned between one flexible wall and the rigid wall, inserting the assembly into a split housing, and then connecting together the housing parts.

Preferably the axial assembly includes a common output for the two movable walls and the valve body for the booster.

By positioning the movable wall return spring between one flexible wall and the rigid wall of the assembly, the method proposed by the present invention allows all the internal parts for the booster to be assembled, tested and inspected before being assembled in the housing.

The invention will now be described further by way of example with reference to the accompanying drawings, in which:

FIG. 1 shows a section through a tandem fluid-pressure servo booster on the line II—II of FIG. 2;

FIG. 2 shows a partial end view of the booster of FIG. 1 in the direction of the arrow A;

FIG. 5 shows an end view of the rigid wall in the direction of the arrow C of FIG. 4;

Figure 9:
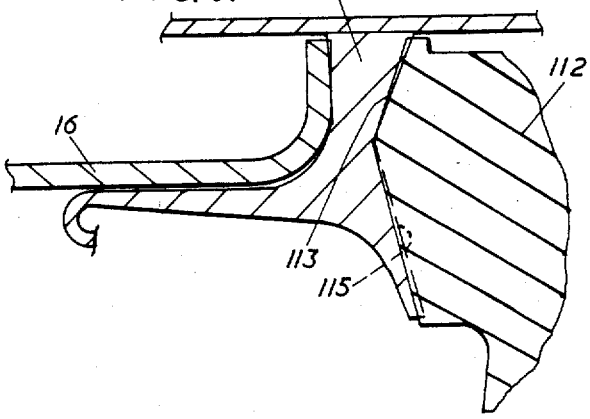
Figure 8:
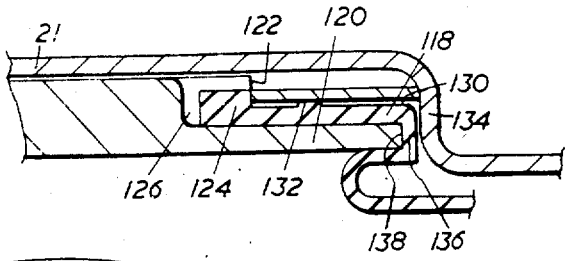
Figure 6:
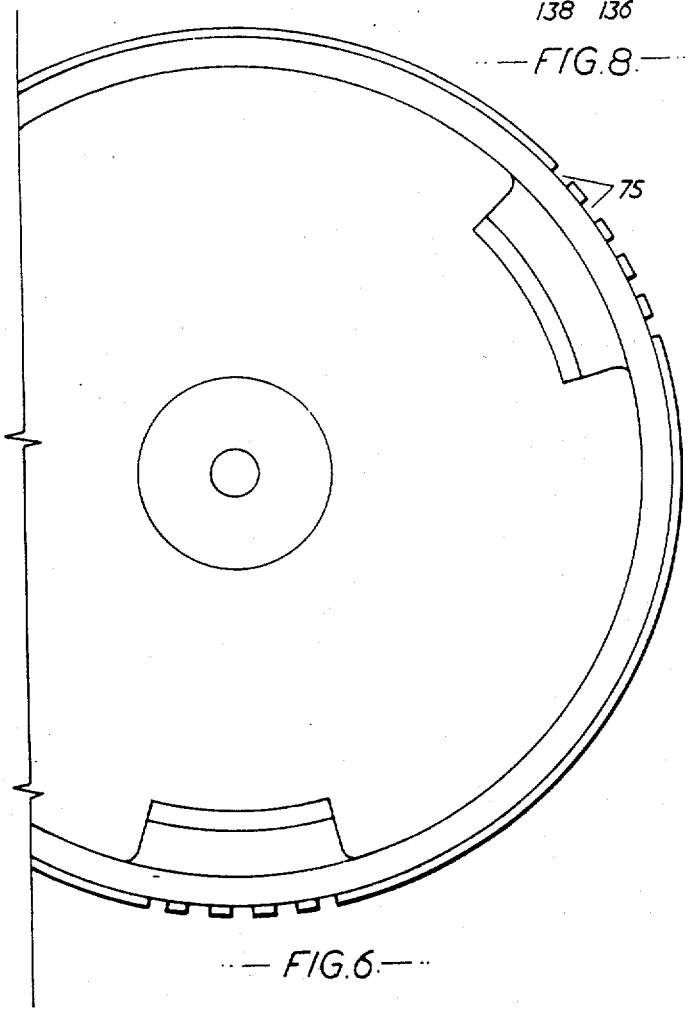
FIG. 6 shows the other end view of the rigid wall in the direction of the arrow D of FIG. 4.
Figure 7:
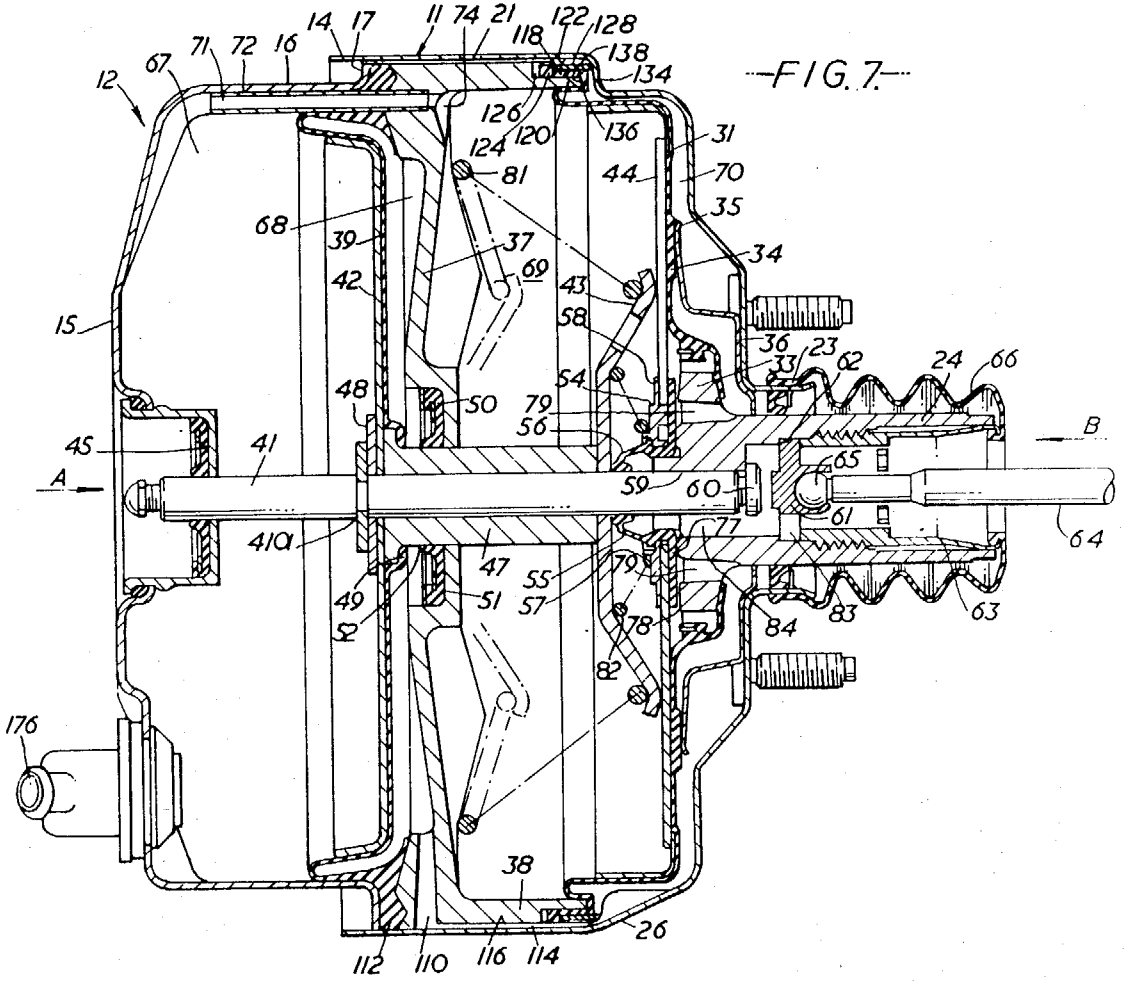
FIG. 7 is a center line section through a second embodiment of a tandem servo-booster constructed in accordance with the present invention.

FIG. 8 is a sectional detail, circled and referenced A in FIG. 7, of the embodiment of FIG. 7 to an enlarged scale, illustrating the manner in which the rear diaphragm is located relative to the fixed partition member; and FIG. 9 is a further sectional detail of the embodiment of FIG. 7 to an enlarged scale, illustrating the manner in which the front diaphragm is located relative to the fixed partition member.

Figure 4:
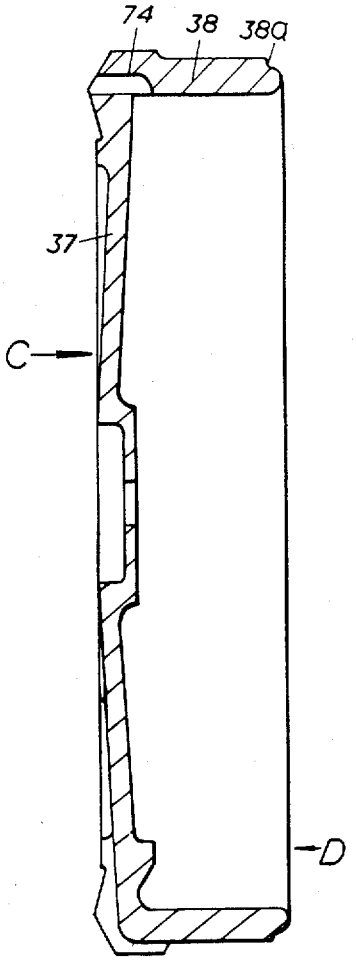
FIG. 4 shows a vertical section through the rigid wall of the booster shown in FIGS. 1, 2 and 3.
Figure 3:
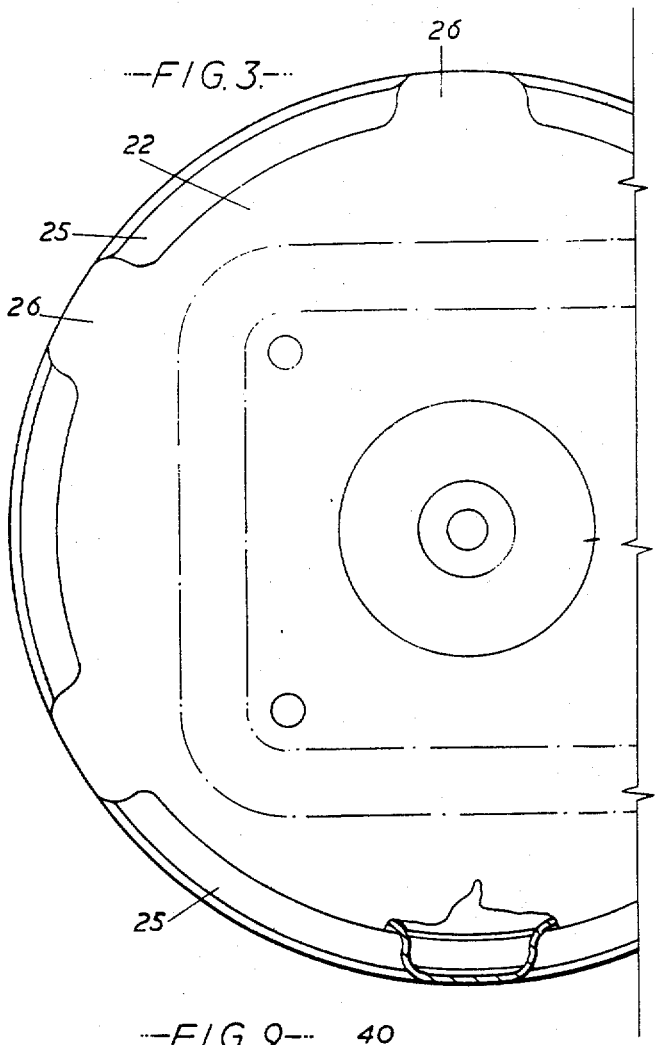
FIG. 3 shows a partial end view of the booster of FIG. 1 in the direction of the arrow B.

The tandem fluid pressure servo booster illustrated in FIGS. 1, 2 and 3 comprises a housing 11 constructed from two sheet metal shells 12 and 13 united, in a manner to be described hereinafter, at a peripheral region 14.

The shell 12 comprises an end wall 15, cylindrical wall 16, and a flange 17 upstanding from wall 16. The end wall 15 has a central opening defined by a lip 18 and a cup-shaped member 19 is inserted into the opening and supported in fluid tight engagement with end wall 15 by a seal 20 between lip 18 and the member 19.

The shell 13 comprises a cylindrical wall 21 and an end wall, generally indicated by numeral 22, which wall 22 has a central opening defined by an axially extending boss 23 within which a valve body 24 is located. The cylindrical wall 21 includes six angularly spaced regions 25 which taper inwardly of the housing towards the end wall 22 and said six regions 25 are thus angularly separated by six radially disposed ribs 26. The regions 25 blend into arcuate shoulders 27, lying in a common plane perpendicular to the axis of the housing, and said shoulders 27 form a seat for a ring 28 which comprises a cylindrical wall 29 adapted to fit snugly against the internal surfaces of the region 25 when a radial flange 30 of ring 28 abuts the shoulders 27. The six radial ribs 26 thus form fluid passages passing outwardly of the ring 28 between said ring 28 and the internal surface of ribs 26.

A first movable wall comprises a diaphragm 31 which has an enlarged periphery 32 seated in the ring 28 and its inner region secured in sealed engagement with a flange portion 33 of the valve body 24. The diaphragm 31 also has a thickened annular region 34 engageable with an outwardly extending flange 35 of a cup-shaped member 36 located between diaphragm 31 and the end wall 22 of shell 13. Cup-shaped member 36 is perforated to allow unrestricted flow of air therethrough.

A rigid wall or partition 37 has an axially extending flange 38 which abuts the enlarged periphery 32 of diaphragm 31 and a second movable wall, comprising a diaphragm 39 with an enlarged periphery 40, has its enlarged periphery 40 in abutment with the periphery of partition 37 on the side opposite to the flange 38. The flange 17 of shell 12 is entered into the open side of shell 13 and secured therein by a crimping operation along region 14 so that the periphery 40 of diaphragm 39, the flange 38 of rigid partition 37 and the enlarged region 32 of diaphragm 31 are sandwiched together and retained between the flange 17 and ring 28.

It should be observed from the drawing that the enlarged peripheral region 32 of diaphragm 31 has an axially directed lip 32a which engages in a peripheral recess 38a in the flange 38. Further, the enlarged peripheral region 40 of diaphragm 39 is located in a tapered recess between the flange 38 and flange 17, the tapered recess widening outwardly from the axis of the device, and the peripheral region 40 is shaped to fit snugly into the tapered recess.

The position of the ring 28 is fixed by its abutment with the shoulders 27 and as the flange 38 is rigid the axial loading pressure applied to the shells 12 and 13 is absorbed entirely by the peripheries 32 and 40. The peripheral region of the diaphragms 31 and 39 are thus axially loaded and this loading in combination with the shape of the peripheries 32 and 40, resist displacement of the diaphragms from their peripheral locations.

The flange 38 in providing a seat for the peripheral region 32 of diaphragm 31 serves a further purpose in that it prevents the diaphragm region 32 from expanding into or otherwise obstructing the passageways formed by the ribs 26.

A common output rod 41 is disposed in the housing 11 and passes axially in succession through the member 19, an annular plate 42 supporting the diaphragm 39, the diaphragm 39, rigid partition 37, a fulcrum plate 43, a finger plate 44 contacting the inner surface of diaphragm 31, diaphragm 31, and into the valve body 24. A sealing member 45, retained in cup-shaped member 19 by a ring 46, forms a fluid pressure seal between member 19 and the push rod 41.

The rod 41 has a sleeve 47 supported thereon and the sleeve 47 abuts fulcrum plate 43 at one end face and plate 42 at the other end face. A spring ring 48 in an annular groove 41a in rod 41 retains plate 42 against the adjacent end face of sleeve 47.

The diaphragm 39 presents an axially extending lip 49 in sealing engagement with the sleeve 47 and an annular sealing member 50, housed in a recess 51 in the rigid partition 37, presents an annular axially extending lip 52 in sealing engagement with the sleeve 47. Sealing member 50 is retained in recess 51 by a spring ring 53.

The innermost regions of the fingerplate 44 are restrained axially on one side by a spring register 54 and an annular sealing member 55 defines a seal between spring register 54 and the rod 41. The sealing member 55 is a double lip seal and the maximum internal diameter 56 between the lips is less than the minimum diameter of the recess 57 of the member 55 in which the spring register 54 is engaged.

Sealing member 55 also includes an enlarged annular flange 58 which lies between the free sides of the innermost regions of the flanges of fingerplates 44 and the end face of the valve body 24.

The rod 41 is slidably disposed in a bore 59 of valve body 24 and a screw 60, having an enlarged head greater in diameter than the diameter of bore 59, is screwed axially to the end of the rod 41. The head of screw 60 is located in an enlarged bore region of valve body 24 and the socket head 61 of a ball joint connection is engaged against an internal shoulder 62 of valve body 24 so as to be normally spaced from screw 60. The socket head 61 is retained in valve body 24 by a tubular sleeve 63 and an actuating rod 64 presents a ball end 65 which is housed in the socket 61 to complete the ball and socket connection.

A flexible seal 66 extends between the outer end of sleeve 63 and the boss 23 of end wall 22.

The diaphragm 39 defines a movable wall for a first chamber 67 to the left side of the diaphragm 39, as seen in FIG. 1, and the movable wall of a second chamber 68 between the diaphragm 39 and the rigid partition 37. The diaphragm 31 defines, in combination with rigid partition 37, a third chamber 69 and a fourth chamber 70 is defined by the diaphragm 31, and end wall 22.

The chambers 67 and 69 are connected for common pressure conditions by tubular ducts 71 arranged in three groups, each of two ducts 71, housed in three angularly spaced ribs 72 on cylindrical wall 16 of shell 12. The tubular ducts 71 extend through shaped slots 73 in the enlarged periphery 40 of diaphragm 39 and into passageways 74 in the axially extending flange 38 of partition 37. The passageways 74 opening into the chamber 69 so that chambers 67 and 69 are open in communication through passageways 74 and the ducts 71.

The chambers 68 and 70 are connected by the pressure fluid passages between annular ring 28 and the six radial ribs 26, and slots 75, cut in three angularly spaced regions of the outer periphery of the flange 38 of partition 37, and thus fluid pressure passages are provided between chambers 68 and 70 to maintain said chambers in open communication.

A connection 76 at end wall 15 allows chamber 67, and thereby chamber 69, to be continuously connected to a low pressure source (not shown).

The tandem fluid-pressure servo booster described above with reference to the drawings operates as follows:

In the normal inoperative position for the booster illustrated in FIG. 1 the actuating rod 64 adopts the position shown in FIG. 1 with the socket head 61 spaced from the screw 60. The flange 58 of sealing member 55 is resting on an annular valve seat 77 on flange 33 of valve body 24 to prevent flow of air from the interior of valve body 24 into the housing 11. At the same time flange 58 is unseated from an annular valve seat 78 on flange 33 so that the interior of chamber 70 communicates with chamber 69 by way of passageways 79 through flange 33, between valve seats 77 and 78, openings between the fingers of finger plate 44 and holes 80 in the fulcrum plate 43.

The connection 76 maintains chamber 67 in communication with the low pressure source and thus chamber 67, and chamber 69 communicating therewith, are maintained at a substantially constant low pressure. The chamber 70, and chamber 68 in open communication therewith, is open to chamber 69 through passageways 79 so that all the chambers 67, 68, 69 and 70 are established and maintained at a substantially uniform low pressure.

A spiral compression spring 81 between partition 37 and fulcrum plate 43 urges the fulcrum plate 43 and thereby diaphragms 31 and 39 into the inoperative position illustrated and a coil compression spring 82 acts between fulcrum plate 43 and spring register 54 tensions flange 58 against the valve seat 77.

When the booster is to be actuated, actuating rod 64 is advanced towards the left (as seen in FIG. 1) so that socket head 61 and sleeve 24 are also moved towards the left. The movement of sleeve 24 towards the left is resisted by spring 81 acting on fulcrum plate 43 and spring 82 acting on spring register 54 the actual force exerted by spring 82 is less than that of spring 81 so that initial movement of sleeve 24 causes the fingers of finger plate 44 to bend about the annulus of contact with the fulcrum plate 43, the deflection of the fingers increases as the sleeve 24 moves towards the left until eventually the flange 58 of sealing member 55, engages the second annular valve seat 78. In this position of the assembly the flange 58 of sealing member 55 is seated on both annular valve seats 77 and 78.

Further movement of the valve body 24 causes both annular valve seats 77 and 78 to act on flange 58 causing further bending of the deflecting fingers of finger plate 44 and as the inclination of the fingers increases the pressure between valve seat 77 and flange 58 reduces until eventually flange 58 lifts off the valve seat 77.

When flange 58 lifts off valve seat 77 atmosphere flows through the hollow sleeve 63, passageways 83 in the socket head 61, and by way of passageways 84, parallel to rod 41, to the internal end face of the flange 33 of valve body 24. The air at the end face of flange 33 flows between the valve seat 77 and the unseated flange 58 and through passageways 79 into the cup-shaped member 36 so as to act against the right-hand side of diaphragm 31. The diaphragm 31 disengages from engagement with flange 35 of cup shaped member 36 and an air flow into chamber 70 is thus established.

The air flow into chamber 70 increases the pressure in chamber 70 and air flow by way of the passageways around annular ring 28 and through the slots 75, in the periphery of partition 37 into chamber 68 whereby both chambers 70 and 68 experience an increase in internal pressure.

As air flows into chambers 68 and 70 diaphragms 39 and 31 are urged towards the left as seen in FIG. 1, diaphragm 31, through finger plate 44, acting against fulcrum plate 43 and diaphragm 39 acts through plate 42 and sleeve 47 on fulcrum plate 43 to urge both moving walls 31 and 39, the sleeve 47, fulcrum plate 43, and the rod 41 towards the left as seen in FIG. 1 against the resistance of spring 81.

The actual displacement of rod 41 is utilized to cause a desired displacement, such as operation of the master cylinder of a vehicle braking system, and when rod 41 is connected to the piston of the master cylinder the master cylinder piston will be subject to the same displacement as the rod 41.

Displacement of rod 41 towards the left continues with continued displacement of the actuating rod 64 towards the left. When the displacement of rod 64 is terminated the force exerted on the diaphragm 31 outwardly of the contact annulus of fulcrum plate 43 acts on the fingers ring 44 to cause the fingers to deflect so that flange 58 again seats on both annular valve seats 77 and 78 whereby the system is held in a substantially locked position.

When the actuating rod 64 is moved towards the right as seen in FIG. 1 valve body 24 also moves towards the right, the air pressure in chamber 70 acting on the finger ring 44 in combination with the relief of pressure on flange 58 due to the displacement thereof, caused the fingers to deflect such that flange 58 is unseated from valve seat 78 and seats on valve seat 77 to terminate the flow of air from the interior of the valve sleeve 24 into chamber 70. At the same time the unseating of flange 58 from seat 78 whereby the air in chambers 70 and 68 flow from said chambers through the passageways 79 in flange 33, between the fingers of the finger plate 44, through openings 80 in the fulcrum plate 43 and thus into chamber 69.

Thus during the return of valve body 24 all the chambers communicate with the low pressure source and are brought to a substantially uniform low pressure.

As the air pressure in chamber 70 and 68 falls the return spring 81 urges fulcrum plate 43 away from partition 37, fulcrum plate 43 acts directly on finger plate 44 to displace diaphragm 31 towards the right and, by way of the connection of annular plate 42 with sleeve 47 to fulcrum plate 43 the diaphragm 38 is moved back towards the start position. The movement of the valve body towards the right causes rod 41 to be retracted and displacement of the moving part towards the right continues until all the parts are returned to the start position illustrated in FIG. 1.

It would be seen from the illustrated embodiment that the control rod 41 can be assembled with the valve body 24 (by the screw 60) and the booster elements can be axially assembled on the rod 41 before the assembly is inserted into the casing 11.

With construction according to the invention, the return spring 81 is located between the fulcrum plate 43 and the rigid wall or partition 37 so that the whole of the internal assembly can be built up, inspected and tested before the assembly is inserted into the casing 11. The method of sandwiching the peripheral regions 32 and 40 of the two diaphragms on either side of the annular flange 38 between the ring 28 and flange 17 allows the periphery of both diaphragms 31 and 39 to be equally stressed and restrained.

The construction of the tandem servo-booster embodiment shown in FIGS. 7, 8 and 9 of the drawings is basically the same as that of the embodiment illustrated in FIGS. 1 to 6 and like reference numerals have therefore been used to denote identical parts in the two embodiments. The embodiment shown in FIGS. 7, 8 and 9 differs from the first embodiment primarily in two portions of the booster, namely the means by which a permanent connection is achieved between the chambers 68 and 70, and the means by which the peripheral bead of the rear diaphragm 31 is located relative to the housing 11.

In the second construction, the slots 75 are replaced by one or more holes 110 which extend radially through a solid portion 112 of the rigid housing portion 37. As illustrated in FIG. 9, the forward facing surface 113 of the partition member 37 forms an effective seal with the rearward facing surface 115 of the diaphragm peripheral portion 40. As in the case of the slots 75, the holes 110 communicate with fluid passages 114 defined between the radially outer surface 116 of the axially extending flange 38 of the rigid housing partition 37 and the inner surfaces of the six ribs 26 in the cylindrical housing wall 21.

Clearly the number and groupings of the radially extending holes 110 are capable of considerable variations. For example, (i) a single such hole 110 can be provided which communicates with a single passageway 114 corresponding to the provision of a single rib 26; (ii) a plurality of holes 110 can communicate with a plurality of passageways 114; (iii) a plurality of holes 110 can communicate with a single passageway 114; any combination of (i), (ii) and (iii) can be provided at circumferentially spaced locations around the periphery of the booster housing.

In the first embodiment, the outer enlarged portion 32 (bead) of the diaphragm 31 is constrained between the rearward end of the axially extending partition flange 38 and the annular ring 28 which abuts the shoulders 27 formed by the housing wall. Although the bead 32 has an axially directed lip 32a which engages in a peripheral recess 38a in the flange 38 and which provides a certain amount of radial retention for the bead, the arrangement is such that the retention predominantly acts against displacement of the bead in an axial direction.

In the second embodiment, the peripheral portion 118 of the diaphragm 31 is no longer in the form of a fat, annular bead but is considerably thinner in its radial dimension, having a cross-section which is generally rectangular, as shown in the drawing. This peripheral portion 118 extends axially of the booster housing and embraces a reduced diameter end portion 120 of the flange 38. Over the majority of its length, the outer end of the peripheral portion 118 engages a radially outwardly extending shoulder 122 provided on the flange 38. However, at circumferentially spaced intervals, the peripheral portion 118 is provided with axially extending tongues 124 which are thicker in the radial direction than the remainder of the peripheral portion 118. Each tongue 124, of which there are 10 in this case, is received in a respective recess 126 in the shoulder 122 of the flange 38.

The peripheral portion 118 of the diaphragm 31 is held in position on the reduced diameter portion 120 of the flange 38 by an annular retaining band 128 of rectangular section. As shown in FIG. 8, the outer surface 130 of the peripheral portion 118 is provided with one or more tooth-like projections 132 which are firmly gripped by the periphery portion 118 in a manner to inhibit removal of the diaphragm therefrom. One axial end of the band 128 is engaged by a shoulder 134 in the housing 11 and the other axial end engages the tongues 124 to firmly locate the tongues in position in their respective recesses 126.

The peripheral portion 118 is connected to the main portion of the diaphragm 31 by way of a radially extending portion 136 which is located between the housing shoulder 134 and the rear end surface 138 of the flange 38.

In the above described manner, the peripheral portion 118 is positively located relative to the housing 11 in both an axial and a radial sense, the tongues 124 engaged in the recesses 126 preventing rotation of the diaphragm 31 relative to the housing 11.

The aforegoing second construction enables the overall diameter of the booster housing to be reduced, which factor can be critical in some vehicle installations.

In respect of all other features of construction and operation, the second embodiment is substantially identical to the first embodiment.

I claim:

1. A tandem fluid-pressure servo booster comprising a housing, a rigid internal wall within the housing, a movable wall on each side of said rigid internal wall, said walls defining four chambers axially spaced within the housing, a plurality of fluid passageways defined between an internal surface of said housing and the periphery of said rigid internal wall connecting a first pair of said chambers, and a plurality of tubular ducts, within said housing, connecting a second pair of said chambers, said tubular ducts each having an end region located in said rigid internal wall and passing through peripheral regions of one of the said movable walls.

2. A tandem fluid-pressure servo booster as claimed in claim 1 and wherein said movable wall through which the tubular ducts pass, comprises a flexible diaphragm.

3. A tandem fluid-pressure servo booster as claimed in claim 2 and wherein said flexible diaphragm includes an enlarged peripheral region.

4. A tandem fluid-pressure servo booster as claimed in claim 3 and wherein said enlarged peripheral regions of said flexible diaphragms are axially retained between an internal shoulder defined by the housing and said rigid internal wall.

5. A tandem fluid-pressure servo booster as claimed in claim 3 and wherein the tubular ducts pass through the enlarged peripheral regions of the diaphragm.

6. A tandem fluid-pressure servo booster as claimed in claim 1 and wherein said rigid internal wall includes inclined surfaces which seat against inclined surfaces in the peripheral region of the movable wall through which said tubular ducts pass.

7. A tandem fluid-pressure servo booster comprising a housing, a rigid internal wall within the housing, a movable wall on each side of the rigid wall, said walls defining four chambers axially spaced within the housing, a plurality of fluid passageways between an internal surface of the housing and the periphery of the rigid wall connecting a first pair of said chambers, and a plurality of tubular ducts, within the casing, connecting a second pair of said chambers, said tubular ducts each having one end located in the rigid internal wall and passing through the peripheral regions of one of the movable walls and wherein the rigid internal wall has a flange extending axially away from the tubular ducts.

8. A tandem fluid-pressure servo booster as claimed in claim 7 and wherein the tubular ducts lie substantially parallel to the axis of the booster and the rigid internal wall includes radial and axial passages opening to the tubular ducts and to the chamber adjacent the rigid wall and remote from said ducts.

9. A tandem fluid-pressure servo booster as claimed in claim 7 and wherein the movable wall through which the tubular ducts pass includes an inwardly directed lip in sealing engagement with the rigid internal wall.

10. A tandem fluid-pressure servo booster as claimed in claim 7 and wherein the tubular ducts are arranged in groups and said groups are spaced circumferentially about the peripheral regions of the rigid internal wall.

11. A tandem fluid-pressure servo booster as claimed in claim 7 and wherein the tubular ducts each have one end located in the rigid internal wall and said flange is in sealing engagement with the peripheral regions of the movable wall remote from the tubular ducts.

12. A tandem fluid pressure servo booster according to claim 7 wherein said flange engages and seals a peripheral region of one of the movable walls against an annular ring seated within the housing.

13. A tandem fluid-pressure servo booster as claimed in claim 12 and wherein said flange has its outer end region reduced in diameter to enter into an axially extending peripheral flange on the movable wall remote from said tubular ducts.

14. A tandem fluid-pressure servo booster as claimed in claim 12 in which the movable wall remote from the tubular ducts has an enlarged peripheral region which is axially retained between the flange of the internal wall and an annular ring seated within the housing, said annular ring defining a cylindrical wall and a radial flange, the peripheral regions of the movable wall being seated within the cylindrical wall and the radial flange being seated against radial shoulders within the housing.

15. A tandem fluid-pressure servo booster as claimed in claim 12 and wherein an axially extending peripheral flange on the movable wall is held in position on the reduced end of the flange of the rigid internal wall by an annular retaining band.

16. A tandem fluid-pressure servo booster as claimed in claim 15 and wherein said axially extending peripheral flange on the movable wall includes at least one annular projection upstanding from the outer surface of said flange and the annular retaining band engages said annular projection to inhibit removal of the peripheral flange from the flange of the rigid internal wall.

17. A tandem fluid-pressure servo booster as claimed in claim 12 in which the peripheral flange of the movable wall includes axially extending tongues which are received in respective recesses in the flange of the rigid internal wall and said tongues have a thickness, in the radial direction, greater than the thickness of the remaining parts of said peripheral flange.

18. A tandem fluid-pressure servo booster comprising a housing, a rigid internal wall within the housing, a movable wall on each side of said right internal wall, said walls defining four chambers axially spaced within the housing, an axially extending flange on said rigid wall the housing includes ribs defining fluid passageways radially outwardly of a flange of the rigid internal wall and passing radially over a union between said flange and a movable wall engaged thereon, said fluid passageways connecting a first pair of said chambers, and a plurality of tubular ducts, within said housing, connecting a second pair of said chambers, said tubular ducts each having an end region located in said rigid internal wall and passing through the peripheral regions of one of the movable walls.

19. A tandem fluid-pressure servo booster as claimed in claim 18 and wherein the face of the rigid internal wall remote from the flange includes radial slots connecting the said fluid passageways with that chamber between said slotted side of said rigid internal wall and the movable wall adjacent thereto.

20. A tandem fluid-pressure servo booster as claimed in claim 18 in which the fluid passageways are connected to the chamber between the side of the rigid internal wall remote from the flange and the movable wall adjacent thereto by holes passing substantially radially through the peripheral regions of the said rigid internal wall.

21. A tandem fluid-pressure servo booster as claimed in claim 18 in which the housing comprises two metal shells connected together at cooperating peripheral regions and peripheral regions of said two movable walls and said internal rigid wall are clamped axially between radial shoulders of the two shells.

22. A tandem fluid-pressure servo booster comprising a housing, a rigid internal wall within the housing and a movable wall on each side of said rigid internal wall, said walls defining four chambers axially spaced within the housing, a plurality of fluid passageways defined between an internal surface of said housing and the periphery of said rigid wall connecting a first pair of said chambers and a plurality of axially extending fluid ducts connecting a second pair of said chambers, an axially extending rod connecting both movable walls and constituting a common output rod, said axially extending ducts being radially spaced from the axis of said output rod, a first one of said movable walls being axially located on the common output rod by a sleeve member and said movable wall presenting an axially extending resilient lip sealingly engaged with the sleeve.

23. A tandem fluid-pressure servo booster as claimed in claim 22 and wherein the sleeve passes through the rigid internal wall and a flexible seal is provided between the internal wall and the sleeve.

* * * * *